United States Patent
Jepsen

(10) Patent No.: US 9,310,634 B2
(45) Date of Patent: Apr. 12, 2016

(54) AESTHETIC LAYER FOR DISPLAY PANELS

(71) Applicant: Google Inc., Mountain View, CA (US)

(72) Inventor: Mary Lou Jepsen, Sausalito, CA (US)

(73) Assignee: Google Inc., Mountain View, CA (US)

( * ) Notice: Subject to any disclaimer, the term of this patent is extended or adjusted under 35 U.S.C. 154(b) by 140 days.

(21) Appl. No.: 14/139,605

(22) Filed: Dec. 23, 2013

(65) Prior Publication Data

US 2015/0177538 A1 Jun. 25, 2015

(51) Int. Cl.
G02F 1/1333 (2006.01)
G09G 3/20 (2006.01)
G02F 1/1335 (2006.01)
H04N 5/64 (2006.01)
G09F 9/30 (2006.01)

(52) U.S. Cl.
CPC .... *G02F 1/133308* (2013.01); *G02F 1/133524* (2013.01); *G09G 3/20* (2013.01); *H04N 5/64* (2013.01); *G02F 2001/13332* (2013.01); *G02F 2001/133562* (2013.01); *G09F 9/30* (2013.01); *G09G 2300/023* (2013.01)

(58) Field of Classification Search
CPC .... G09G 2300/023; G09G 3/20; G02F 1/139; G02F 1/133524; G02F 1/133504; G02F 1/1334; G02F 1/133308; H04N 5/64
See application file for complete search history.

(56) References Cited

U.S. PATENT DOCUMENTS

| | | | |
|---|---|---|---|
| 7,145,611 B2 | 12/2006 | Dubin et al. | |
| 7,221,363 B2 | 5/2007 | Roberts et al. | |
| 7,339,625 B2 | 3/2008 | Matthys et al. | |
| 7,495,638 B2 | 2/2009 | Lamvik et al. | |
| 7,651,230 B2 | 1/2010 | O'Neill | |
| 7,687,781 B2 | 3/2010 | Han et al. | |
| 7,744,289 B2 | 6/2010 | Hu | |
| 8,243,230 B2 * | 8/2012 | Oversluizen et al. | 349/63 |
| 8,579,466 B2 | 11/2013 | Meir et al. | |
| 2003/0117545 A1 | 6/2003 | Coker et al. | |
| 2006/0012733 A1 | 1/2006 | Jin et al. | |
| 2008/0179597 A1* | 7/2008 | Yamazaki et al. | 257/59 |
| 2009/0168319 A1 | 7/2009 | Jeon et al. | |
| 2010/0177261 A1 | 7/2010 | Jin et al. | |
| 2011/0141551 A1* | 6/2011 | Uchida et al. | 359/316 |
| 2011/0216494 A1 | 9/2011 | Gotham et al. | |
| 2012/0236483 A1* | 9/2012 | Watanabe | 361/679.01 |
| 2013/0093646 A1 | 4/2013 | Curtis et al. | |

FOREIGN PATENT DOCUMENTS

WO WO 2010/126208 11/2010

OTHER PUBLICATIONS

PCT/US2014/058693, PCT International Search Report and Written Opinion, mailed Jan. 5, 2015 (7 pages).

* cited by examiner

*Primary Examiner* — James Dudek

(74) *Attorney, Agent, or Firm* — Blakely Sokoloff Taylor & Zafman LLP

(57) ABSTRACT

A display apparatus includes a display layer for generating images to be viewable from a viewing region and an aesthetic layer disposed over the display layer. Activation circuitry is coupled to activate the aesthetic layer in response to an input. When the aesthetic layer is activated, it emits or reflects aesthetic light.

14 Claims, 6 Drawing Sheets

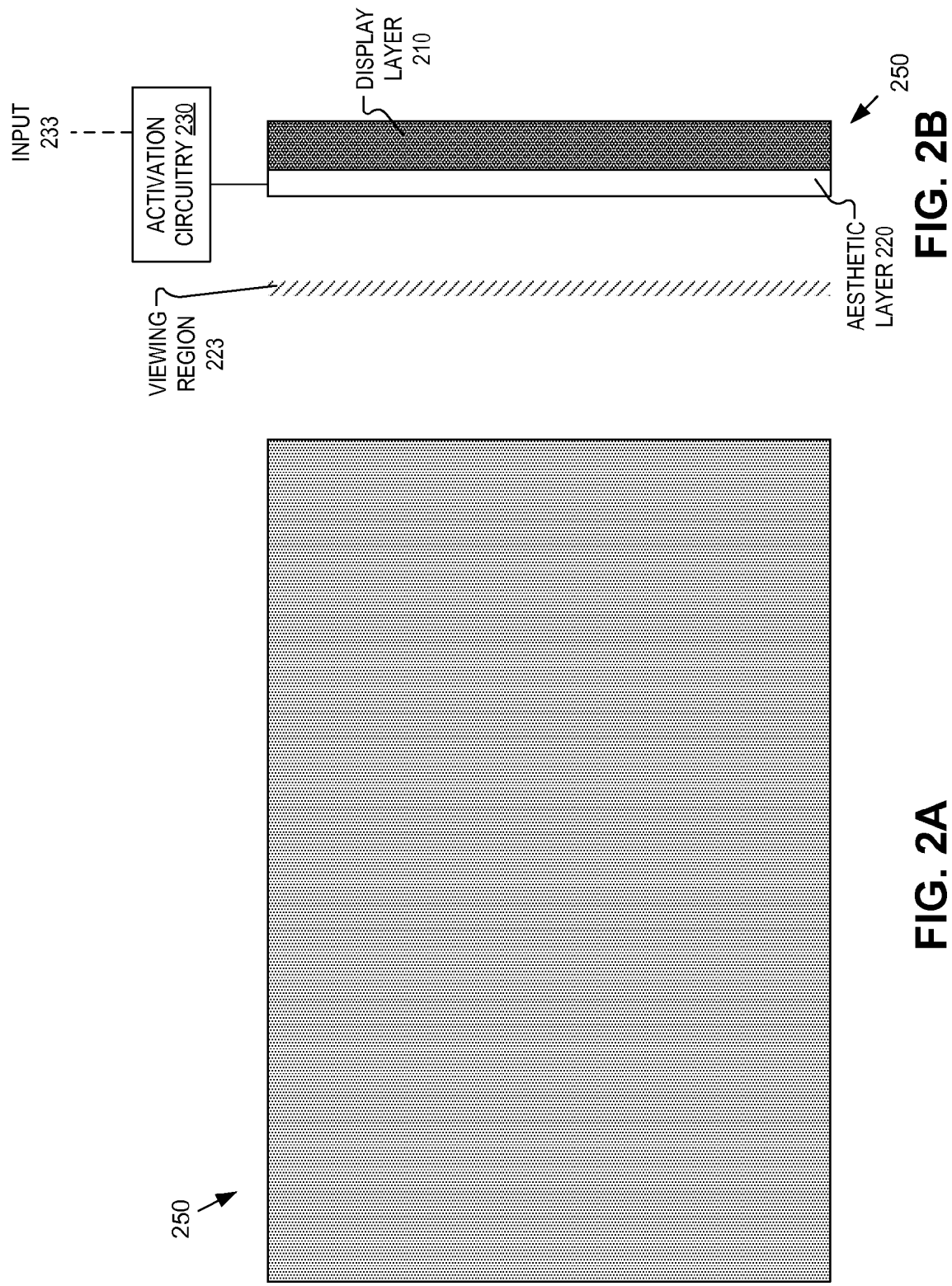

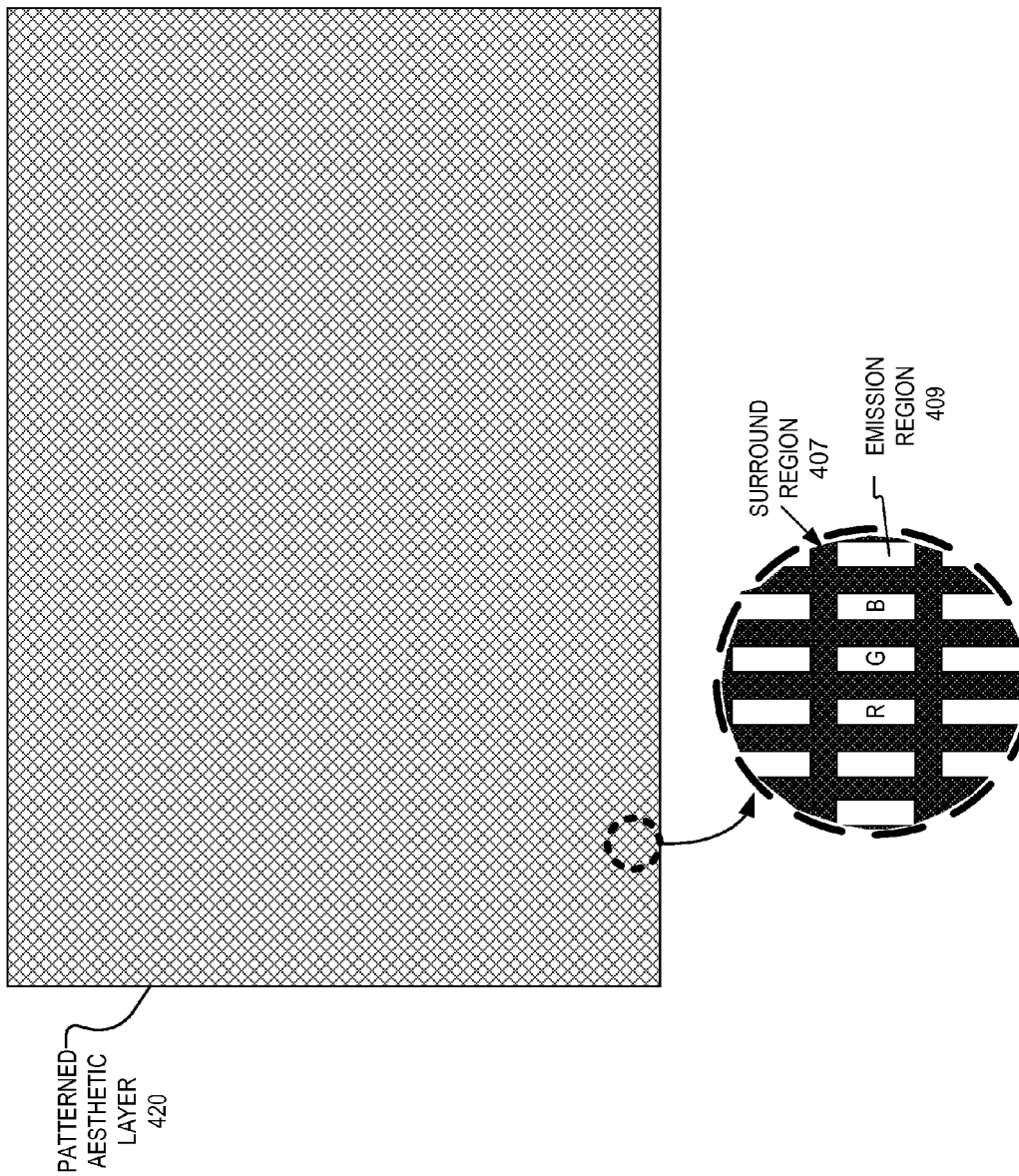

AESTHETIC LAYER FOR DISPLAY PANELS

TECHNICAL FIELD

This disclosure relates generally to optics, and in particular but not exclusively, relates to display panels.

BACKGROUND INFORMATION

Display panels continue to increase in size as the price of larger displays is driven downward by demand from private consumers and corporations. As a result, large displays may occupy a substantial portion of a room or a wall area and thereby have a significant visual presence. Modern liquid-crystal-displays ("LCDs") and plasma displays include a display area that is dark (e.g. black or grey) when the display is turned off. FIG. 1 shows a conventional display panel 150 mounted on a wall 110 where the display panel 150 covers a significant amount of the surface area of wall 100. A significant portion of the population may perceive the combination of the size and the dark color of the display panel 150 as contributing a negative aesthetic to the space where the display panel resides.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 2A and 2B illustrate a front view and a side view of a display panel that includes a display layer, an aesthetic layer, and activation circuitry for activating the aesthetic layer, in accordance with an embodiment of the disclosure.

FIGS. 4A-4D illustrate patterned aesthetic layers, in accordance with embodiments of the disclosure.

DETAILED DESCRIPTION

Figure 1:
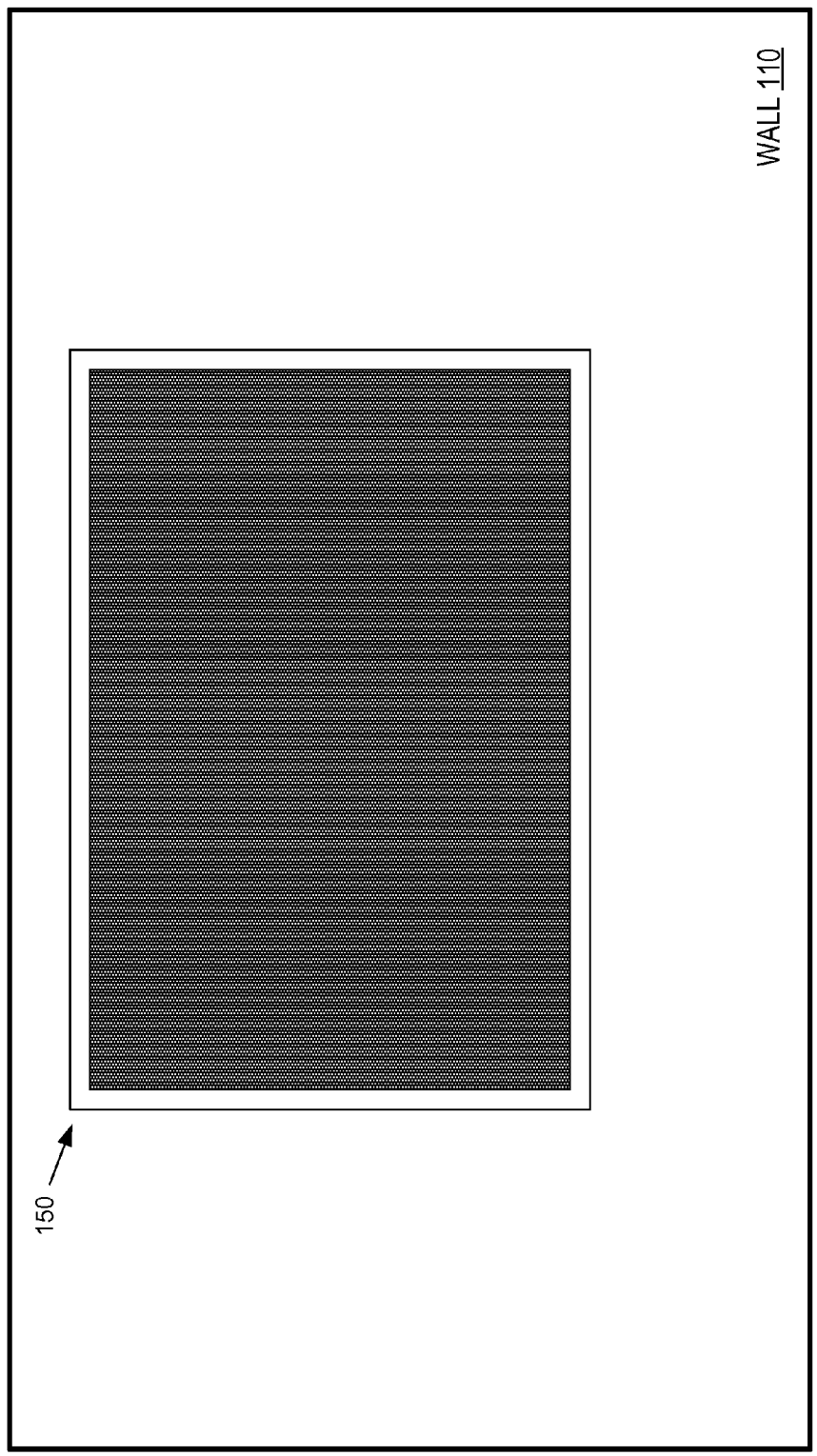
FIG. 1 shows a conventional display panel mounted on a wall.

Embodiments of a display panel with an aesthetic layer are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 2A illustrates a front view of display panel 250 and FIG. 2B illustrates a side view of display panel 250 that includes a display layer 210, an aesthetic layer 220, and activation circuitry 230 for activating aesthetic layer 220, in accordance with an embodiment of the disclosure. When aesthetic layer 220 of display panel 250 is not activated, a viewer can see display layer 210 (and images generated by display layer 210) through aesthetic layer 220. However, if aesthetic layer 220 was activated (by activation circuitry 230), the dark coloring (e.g. gray or black) of display layer 210 would not be as easily seen. Display layer 210 generates image(s) for viewing by viewers from a viewing region. Display layer 210 may include conventional display technologies such as a plasma display or a liquid-crystal-display ("LCD"). Display layer 210 may be a multi-panel display including a plurality of tileable displays. Potential advantages of embodiments of this disclosure include changing the aesthetic of having a display panel (especially a large display panel) in a space or room. When the aesthetic layer 220 is activated, the aesthetic layer reflects or emits aesthetic light (with a pleasing color) which viewers see instead of the traditionally dark display layer 210, which some consider to have a negative aesthetic effect.

FIG. 2B illustrates a side view of display panel 250. In FIG. 2B, aesthetic layer 220 is disposed over display layer 210. Aesthetic layer 220 is disposed between display layer 210 and a viewing region 223 where viewers may see an image on display layer 210. Depending on the display technology in display layer 210, display layer 210 may be viewable from almost 180 degrees in relation to display layer 210. Activation circuitry 230 is coupled to activate and deactivate aesthetic layer 220 in response to an input signal 233. In one example activation circuitry 230 is coupled to receive an on/off signal as input 233 where the on/off signal turns display layer 210 on and off. In one example, input 233 is a wireless signal from a remote control that is meant to activate aesthetic layer 220. In this case, activation circuitry may include a wireless radio receiver and corresponding logic. Although not illustrated, activation circuitry 230 may also be coupled to turn display layer 210 on and off. In one embodiment, activation circuitry 230 activates aesthetic layer 220 when input 233 indicates that display layer 210 is not generating images and deactivates aesthetic layer 220 when input 233 indicates display layer 210 is generating images. Activation circuitry 230 may include a microprocessor, a Field Programmable Gate Array ("FPGA"), and/or other suitable logic.

FIGS. 3A-3D illustrate example aesthetic layers 320A-D, in accordance with an embodiment of the disclosure. Aesthetic layers 320A-D may be used as aesthetic layer 220. Although FIGS. 3A-D show side views of aesthetic layers 320A-D, it is understood that aesthetic layers 320A-D are two-dimensional layers that cover display layer 210.

Figures 3A, 3B:
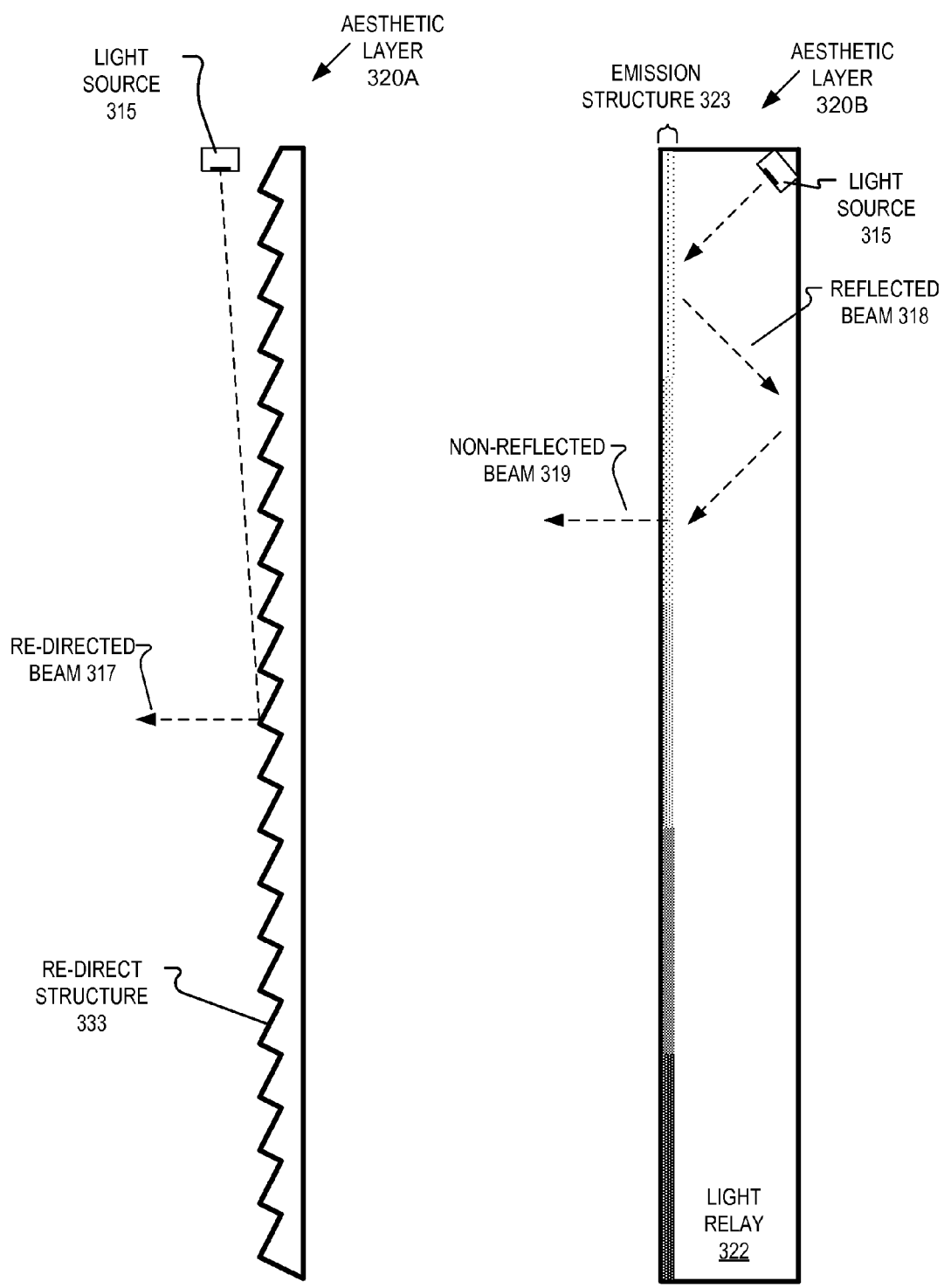
FIGS. 3A-3D illustrate example aesthetic layers, in accordance with embodiments of the disclosure.

FIG. 3A shows a side view of re-direct structure 333 as aesthetic layer 320A. Re-direct structure 333 is a two-dimensional layer that covers display layer 210. To activate re-direct structure 333, at least one light source 315 is activated by activation circuitry 230 and light source 315 emits source light toward re-direct structure 333. Light source(s) 315 may be a laser diode, a light-emitting-diode ("LED"), or otherwise. In one embodiment, light source 315 includes a red-green-blue ("RGB") LED that can be controlled to generate different colors of light. In one embodiment, a "light bar" including a plurality of light source(s) 315 is disposed lengthwise across the top of display panel 250.

Re-direct structure 333 is configured to direct source light from light source(s) 315 toward viewing region 223 as re-directed beam 317. Re-direct structure 333 may include a diffusive material that scatters the source light toward the viewing region. In one embodiment, re-direct structure 333 includes diffractive structures to re-direct the source light in the desired direction as re-directed beam 317. It is appreciated that re-direct structure 333 is implemented on a micro-scale and the illustrated re-direct structure 333 is not illustrated to scale. The angle and position of light source(s) 315 may need to be paired with the angle of the re-direct structure (or diffractive structure) to direct re-directed beam 317 away from re-direct structure 333 at a desirable angle (e.g. approximately orthogonal to the face of display apparatus 250). Re-directed beam 317 is directed toward viewing region 223 as aesthetic light so that viewers of display apparatus 250 see the aesthetic light (re-directed beam 317) instead of the darkened region of display layer 210. The color of the aesthetic light may be dependent on the source light emitted from the light source(s) 315 and light source(s) 315 may be tuned to emit a color of source light that is aesthetically pleasing.

Light source(s) 315 may be mechanically extended from re-direct structure 333 to create an angle that can effectively distribute the source light to the re-direct structure 333. Light source 315 may include a lensing optic to more uniformly distribute the source light to re-direct structure 333. In one embodiment, the angles of the individual structures of re-direct structure 333 is tapered to be increasingly steep as the structures are farther away from the light source(s) 315 to account for the increasing oblique angle that the re-direct structure receives the source light from.

FIG. 3B shows a side view of aesthetic layer 320B including light source 315 and a light relay 322 having an emission structure 323 on the surface of light relay 322 that faces viewing region 223. To activate aesthetic layer 320B, light source(s) 315 is activated (turned on) by activation circuitry 230. Light source(s) 315 emits source light into light relay 322. Light relay 322 receives the source light and maintains Total-Internal-Reflection ("TIR") with an internally reflected percentage of the source light. Emission structure 323 is configured to selectively disrupt the TIR of source light within light relay 322 and consequently facilitate an escaping percentage of the source light to escape light relay 322 and propagate toward viewing region 223 as non-reflected beam 319. The internally reflected percentage of the source light continues propagating within light relay 322 as reflected beam 318. Emission structure 323 may be a speckled imprint (to disrupt TIR) on an otherwise smooth surface of the light relay 322 that faces viewing region 223. In the illustrated embodiment, the number of imprints in emission structure 323 increases as emission structure 323 moves further from light source(s) 315. Tapering the emission structure to increase the escaping percentage of the source light as the source light propagates farther from light source(s) 315 makes the non-reflected beams 319 propagating toward viewing region 223 as aesthetic light more vertically uniform across the face of light relay 322. Similar to the example in FIG. 3A, light source 315 may be configured to emit colored source light that is a pleasing color as the source light will eventually escape light relay 322 as aesthetic light (non-reflected beam 319).

Figures 3C, 3D:
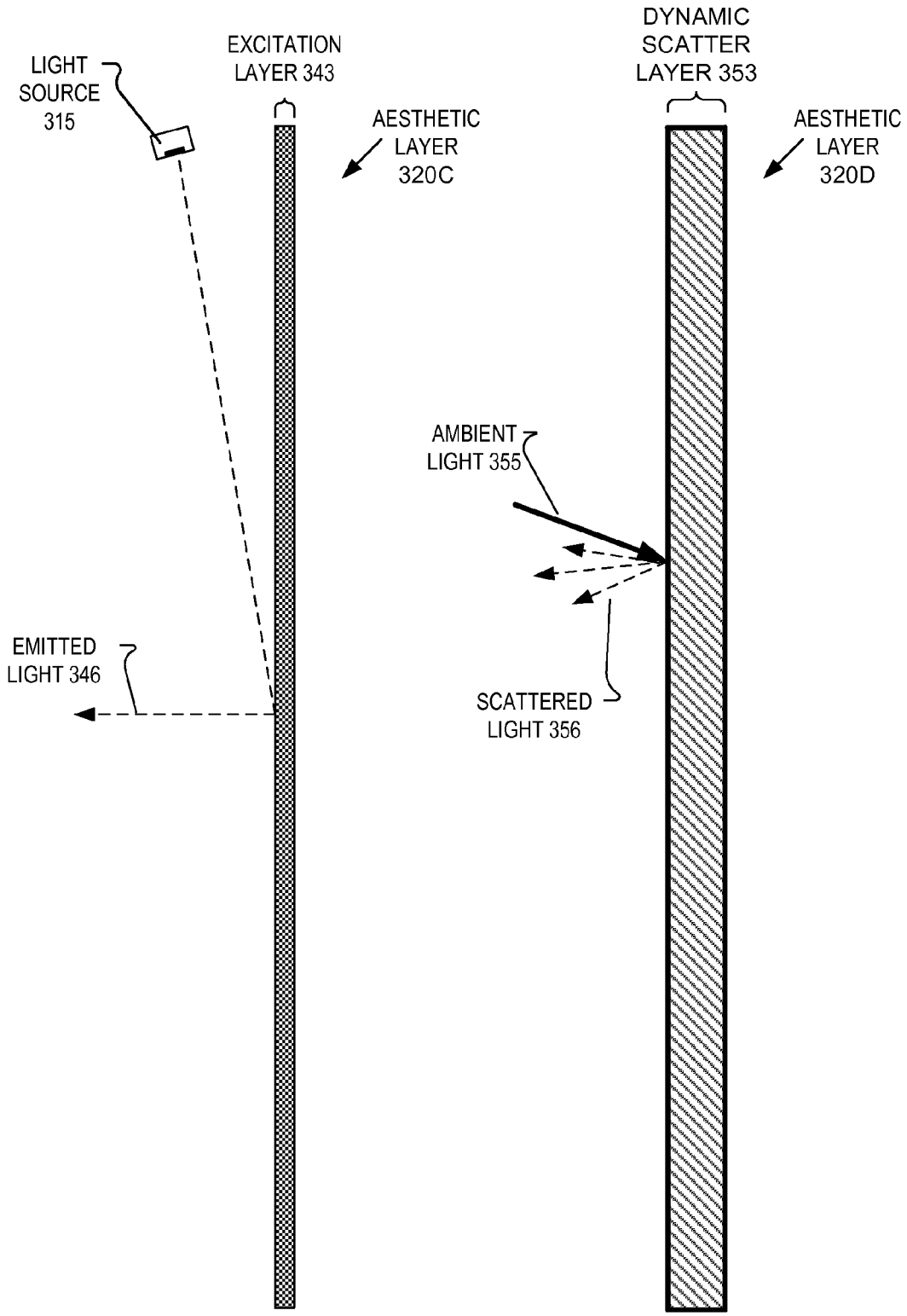

FIG. 3C shows a side view of aesthetic layer 320C including excitation layer 343. To activate aesthetic layer 320C, light source(s) 315 is activated (turned on) by activation circuitry 230. Light source(s) 315 emit source light toward excitation layer 343. Excitation layer is configured to emit aesthetic light (as emitted light 346) in response to being stimulated by source light from light source(s) 315. Excitation layer 343 may include a phosphor or quantum dots that emits a particular color of light when it is stimulated by source light within a stimulating wavelength range. Light source(s) 315 may be configured to emit source light centered within the stimulating wavelength range. In one example, light source(s) 315 are infrared LEDs and the phosphor or quantum dots included in excitation layer 343 are configured to emit emitted light 346 when stimulated by the infrared source light from the infrared LEDs. In one example, light source(s) 315 are near-ultraviolet LEDs and the phosphor or quantum dots included in excitation layer 343 are configured to emit emitted light 346 when stimulated by the near-ultraviolet source light from the near-ultraviolet LEDs. In one embodiment, the concentration of phosphors or quantum dots included in excitation layer 343 increases as excitation layer 343 gets farther from light source(s) 315. This layout may promote more vertical uniformity of emitted light 346, in FIG. 3C.

FIG. 3D shows a side view of an aesthetic layer 320D including a dynamic scatter layer 353. Aesthetic layer 320D may be activated by activation circuitry 230. In one embodiment, dynamic scatter layer 353 includes liquid crystals configured to scatter incoming ambient light 355 as aesthetic light (scattered light 356) when activated and configured to become substantially transparent (allowing viewers to view display layer 210) when not activated. Activating dynamic scatter layer 353 may include modulating a voltage that defines the orientation of the liquid crystals within the dynamic scattering layer. Activating dynamic scatter layer 353 may generate an opaque whitish hue that reflects ambient light 355. In one embodiment, dynamic scatter layer 353 includes addressable liquid crystal pixels that are selectable. In this embodiment, a monochromatic image can be generated on dynamic scatter layer 353.

Figure 4C:
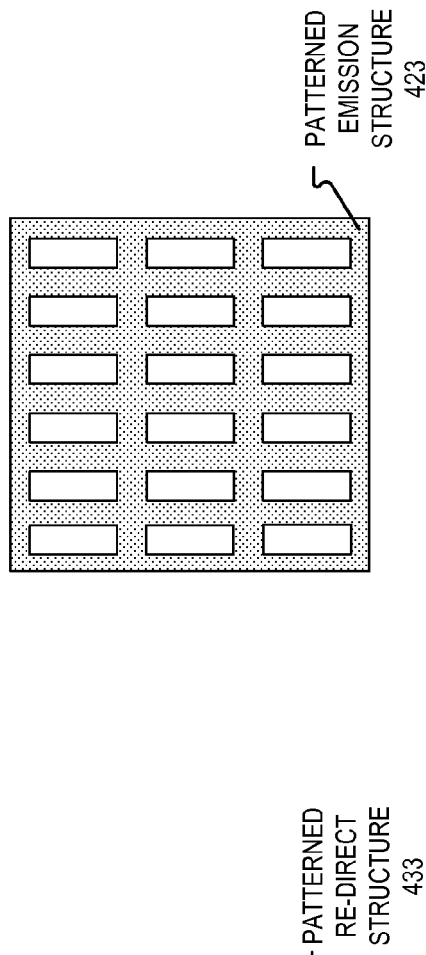

FIGS. 4A-4D illustrate patterned aesthetic layers, in accordance with embodiments of the disclosure. FIG. 4A shows a patterned aesthetic layer 420 as an example that can be used as aesthetic layer 220. FIG. 4A includes a zoomed-in view of a portion of patterned aesthetic layer 420. The zoomed-in view shows that patterned aesthetic layer 420 may only cover a portion of display layer 210. More specifically, in the illustrated embodiment, patterned aesthetic layer 420 does not cover the emission regions 409 (illustrated as white rectangles where display layer 210 emits light) but does cover surround region 407 (illustrated as black fill) that surrounds emission regions 409. Since pixel-based display technologies (e.g. LCD) often have only a small portion (e.g. 5-20%) of the pixels dedicated to actually emitting image light, the aesthetic layer can be patterned to avoid emission region 409 so as to not substantially interrupt the display optics.

Figure 4B:
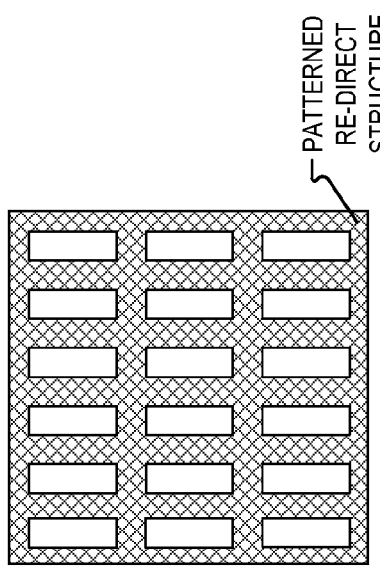

FIG. 4B shows patterned re-direct structure 433 which is a patterned version of re-direct structure 333. Patterned re-direct structure 433 is patterned to cover surround region 407 while not covering emission region 409. Display panel 250 may include patterned re-direct structure 433 in aesthetic layer 420 and the emission area 409 of pixels in display layer 210 may be aligned with the holes in patterned re-direct structure 433 to allow the display light from display panel 250 to reach a viewer without being interrupted by patterned re-direct structure 433. When light source(s) 315 are turned on to activate patterned re-direct structure 433, the holes/gaps in patterned re-direct structure 433 (over pixels of display layer 210) will be substantially unperceivable to a viewer due to their small size and due to the prevalence of aesthetic light (re-directed beam 317) reflecting from the surround region 407 of the patterned re-directed structure 433.

Figure 4D:
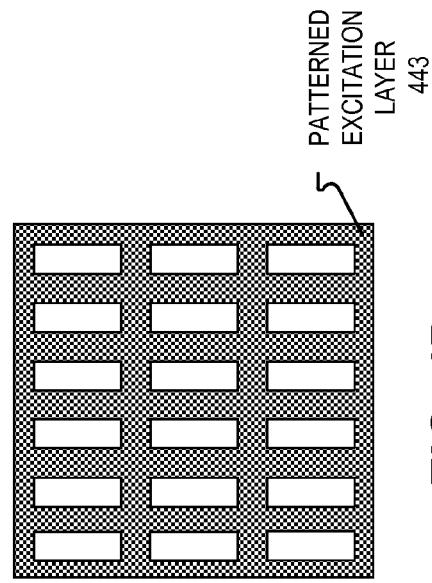

The patterned emission structure 423 illustrated in FIG. 4C is a patterned version of emission structure 323 and is patterned similarly to patterned re-direct structure 433. The white holes/gaps in patterned emission structure 423 would be a smoothed portion of the face of light relay 322 to maintain TIR while the portion covering surround region 407 includes the emission structure 323. The patterned excitation layer 443 illustrated in FIG. 4D is a patterned version of excitation layer 343 and is patterned similarly to patterned re-direct structure 433. Where suitable, patterned layer 423, 433, and 443 may incorporate embodiment (e.g. tapering, concentrations) described in association with the corresponding emission structure 323, re-direct structure 333, and excitation layer 343.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A display apparatus comprising:
   a display layer for generating images to be viewable from a viewing region;
   an aesthetic layer disposed over the display layer, wherein the aesthetic layer is a patterned structure covering a surround region of pixels of the display layer but not substantially covering an emission region of the pixels of the display layer;
   at least one light source coupled to emit source light toward the aesthetic layer when the at least one light source is activated, wherein the aesthetic layer is configured to direct aesthetic light toward the viewing region in response to receiving source light from the at least one light source; and
   activation circuitry coupled to activate the at least one light source in response to an input signal.

2. The display apparatus of claim 1, wherein the aesthetic layer includes the at least one light source and further includes a light relay to receive the source light and maintain Total-Internal-Reflection ("TIR") with an internally reflected percentage of the source light, and wherein an escaping percentage of the source light escapes the TIR of the light relay and propagates toward the viewing region.

3. The display apparatus of claim 2, wherein a surface of the light relay that faces the viewing region includes an emission structure to facilitate escapement of the escaping percentage of the source light.

4. The display apparatus of claim 3, wherein the emission structure is tapered to increase the escaping percentage of the source light as the source light becomes farther from the light source(s).

5. The display apparatus of claim 1, wherein the aesthetic layer includes a re-direct structure configured to direct the source light from the at least one light source toward the viewing region.

6. The display apparatus of claim 1, wherein the at least one light source is at least one of a laser diode or a light-emitting-diode ("LED").

7. The display apparatus of claim 1, wherein the activation circuitry activates the at least one light source when the input signal indicates that the display layer is not generating the images, and wherein the activation circuitry deactivates the at least one light source when the input indicates the display layer is generating the images.

8. The display apparatus of claim 1, wherein the aesthetic layer includes an excitation layer configured to emit the aesthetic light in response to being stimulating by the source light within a stimulating wavelength range, wherein the at least one light source is configured to emit the source light centered within the stimulating wavelength range.

9. The display apparatus of claim 8, wherein the excitation layer includes phosphor.

10. The display apparatus of claim 8, where in the excitation layer include quantum dots.

11. The display apparatus of claim 8, wherein the stimulating wavelength is a near-ultraviolet wavelength.

12. The display apparatus of claim 1, wherein the display apparatus is a multi-panel display including a plurality of tileable displays, and wherein the display layer and the aesthetic layer are distributed among the tileable displays in the plurality of tileable displays.

13. The display apparatus of claim 1, wherein the activation circuitry includes a wireless receiver, and wherein the input signal is a wireless signal.

14. A display apparatus comprising:
    a display layer for generating images to be viewable from a viewing region;
    an aesthetic layer disposed over the display layer;
    at least one light source coupled to emit source light toward the aesthetic layer when the at least one light source is activated, wherein the aesthetic layer is configured to direct aesthetic light toward the viewing region in response to receiving source light from the at least one light source; and
    activation circuitry coupled to activate the at least one light source in response to an input signal,
    wherein the aesthetic layer includes an excitation layer configured to emit the aesthetic light in response to being stimulated by the source light within a stimulating wavelength range, wherein the at least one light source is configured to emit the source light centered within the stimulating wavelength range,
    wherein the stimulating wavelength range includes a near-ultraviolet wavelength.

\* \* \* \* \*